(12) United States Patent
Seergy et al.

(10) Patent No.: US 9,141,984 B2
(45) Date of Patent: *Sep. 22, 2015

(54) AUTOMOBILE TRANSACTION FACILITATION USING A MANUFACTURER RESPONSE

(75) Inventors: Michael J. Seergy, Pine Brook, NJ (US); Benjamin N. S. Brown, Pine Brook, NJ (US)

(73) Assignee: Sidekick Technology LLC, Pine Brook, NJ (US)

( * ) Notice: Subject to any disclaimer, the term of this patent is extended or adjusted under 35 U.S.C. 154(b) by 491 days.

This patent is subject to a terminal disclaimer.

(21) Appl. No.: 13/176,497

(22) Filed: Jul. 5, 2011

(65) Prior Publication Data

US 2012/0109770 A1    May 3, 2012

(51) Int. Cl.
*G06Q 30/00* (2012.01)
*G06Q 30/06* (2012.01)

(52) U.S. Cl.
CPC .................................. *G06Q 30/0605* (2013.01)

(58) Field of Classification Search
USPC ..................................... 705/26.1, 26.3, 27.1
See application file for complete search history.

(56) References Cited

U.S. PATENT DOCUMENTS

| | | | |
|---|---|---|---|
| 5,970,472 A | 10/1999 | Allsop et al. | |
| 6,006,201 A | 12/1999 | Berent et al. | |
| 6,321,221 B1 | 11/2001 | Bieganski | |
| 6,463,431 B1 | 10/2002 | Schmitt | |
| 6,533,173 B2 | 3/2003 | Benyak | |
| 6,868,388 B1 | 3/2005 | Millsap et al. | |
| 6,868,389 B1 | 3/2005 | Wilkins et al. | |
| 7,395,223 B1 | 7/2008 | Buzzell et al. | |
| 7,406,436 B1 | 7/2008 | Reisman | |
| 7,479,949 B2 | 1/2009 | Jobs et al. | |
| 7,636,574 B2 | 12/2009 | Poosala | |
| 8,160,929 B1 | 4/2012 | Park et al. | |
| 8,392,193 B2 | 3/2013 | Schultz et al. | |
| 2002/0065707 A1 | 5/2002 | Lancaster et al. | |
| 2002/0082978 A1 | 6/2002 | Ghouri et al. | |
| 2002/0099628 A1 | 7/2002 | Takaoka et al. | |
| 2002/0111877 A1 | 8/2002 | Nelson | |

(Continued)

OTHER PUBLICATIONS

International Search Report issued Sep. 21, 2012 corresponding to Intl. Application No. PCT/US2012/045546.

(Continued)

*Primary Examiner* — Brandy A Zukanovich
(74) *Attorney, Agent, or Firm* — K&L Gates LLP

(57) ABSTRACT

A system, methods, and apparatus for performing automobile transactions are disclosed. In an example embodiment, automobile market data representative of current automobile market characteristics is stored. The automobile market data may include pricing, inventory, and consumer interest information received from manufacturers, dealers, and consumers. A consumer may provide a request for a manufacturer response indicating whether a specific automobile can be provided. Automobile market data may be provided to a manufacturer based on the request and a manufacturer response provides a verification, confirmation, or offer indicating that the specific automobile can be provided for the consumer. Bids to sell the specific automobile may be requested from dealers based on the manufacturer response. Dealer bids may be provided to the consumer with prices and a delivery options. The consumer may select a bid which specifies a pickup location at a first dealer.

39 Claims, 7 Drawing Sheets

(56) References Cited

U.S. PATENT DOCUMENTS

| | | | |
|---|---|---|---|
| 2002/0128946 A1* | 9/2002 | Chehade et al. | 705/37 |
| 2003/0088435 A1 | 5/2003 | King | |
| 2003/0200151 A1 | 10/2003 | Ellenson et al. | |
| 2003/0229577 A1 | 12/2003 | Nabel | |
| 2004/0034544 A1 | 2/2004 | Fields et al. | |
| 2004/0059626 A1 | 3/2004 | Smallwood | |
| 2005/0004819 A1 | 1/2005 | Etzioni et al. | |
| 2005/0050097 A1 | 3/2005 | Yeh et al. | |
| 2005/0108112 A1* | 5/2005 | Ellenson et al. | 705/27 |
| 2005/0240512 A1 | 10/2005 | Quintero et al. | |
| 2006/0020477 A1 | 1/2006 | Retzbach et al. | |
| 2007/0150362 A1 | 6/2007 | Sharma et al. | |
| 2007/0250403 A1 | 10/2007 | Altschuler | |
| 2007/0255663 A1 | 11/2007 | Jordan et al. | |
| 2007/0260526 A1 | 11/2007 | Bartel | |
| 2008/0046331 A1 | 2/2008 | Rand | |
| 2008/0177653 A1 | 7/2008 | Famolari et al. | |
| 2008/0183552 A1 | 7/2008 | O'Hagan | |
| 2008/0187125 A1* | 8/2008 | Siegrist | 379/220.01 |
| 2008/0201184 A1 | 8/2008 | Rose et al. | |
| 2008/0201188 A1 | 8/2008 | Heyman et al. | |
| 2008/0201203 A1 | 8/2008 | Rose et al. | |
| 2008/0208731 A1 | 8/2008 | Ruckart | |
| 2008/0228657 A1* | 9/2008 | Nabors et al. | 705/80 |
| 2009/0076896 A1 | 3/2009 | DeWitt et al. | |
| 2009/0132348 A1 | 5/2009 | Bria et al. | |
| 2009/0149199 A1 | 6/2009 | Maghoul | |
| 2009/0171761 A1 | 7/2009 | Noy et al. | |
| 2009/0187478 A1 | 7/2009 | Shipley | |
| 2009/0187513 A1 | 7/2009 | Noy et al. | |
| 2009/0198557 A1 | 8/2009 | Wang et al. | |
| 2009/0204600 A1 | 8/2009 | Kalik et al. | |
| 2010/0048242 A1 | 2/2010 | Rhoads et al. | |
| 2010/0106580 A1 | 4/2010 | Etheredge et al. | |
| 2010/0217525 A1 | 8/2010 | King et al. | |
| 2010/0274627 A1 | 10/2010 | Carlson | |
| 2010/0332292 A1 | 12/2010 | Anderson | |
| 2011/0040642 A1 | 2/2011 | O'Dell | |
| 2011/0082759 A1* | 4/2011 | Swinson et al. | 705/26.1 |
| 2011/0087430 A1 | 4/2011 | Boss et al. | |
| 2011/0087556 A1 | 4/2011 | Pitkow | |
| 2011/0099036 A1 | 4/2011 | Sarkissian et al. | |
| 2011/0208418 A1 | 8/2011 | Looney et al. | |
| 2011/0238474 A1 | 9/2011 | Carr et al. | |
| 2011/0238514 A1 | 9/2011 | Ramalingam et al. | |
| 2011/0276394 A1* | 11/2011 | Chan | 705/14.49 |

OTHER PUBLICATIONS

AutoTrader.com, Inc..: Private Company Information—Business Week, http://investing.businessweek.com/research/stocks/private/snapshot.asp?privcapId=92642.

Autotrader.com Introduces IPhone App to Create a More Personalized "PC-to-Pocket" Experience for Car Shoppers, http://www.prnewswire.com/news-releases/autotradercom, Jul. 7, 2011.

AppStore-AutoTrader.com, http://itunes.apple.com/us/app/autotrader-com/id444552888?mt=8, Oct. 31, 2011.

Charlton, Auto Trader: iPhone app review. Mar. 15, 2010 [retrieved on Sep. 6, 2012] from the internet: <URL: http://econsultancy.com/us/blog/5593-auto-trader-iphone-app-review> entire document.

Autodraderuk. Introducing the Auto Trader iPhone App. Mar. 12, 2010 [retrieved on Sep. 6, 2012] from the internet: <URL: http://www.youtube.com/watch?v+6g_1g8IRG4&feature=player_embedded> entire document.

International Search Report mailed Oct. 5, 2012 for corresponding Intl. Appln. No. PCT/US2012/045545.

Anonymous, "instaVIN to offer free auto accident history reports for mobile phones," Wireless News, Jun. 2, 2010.

* cited by examiner

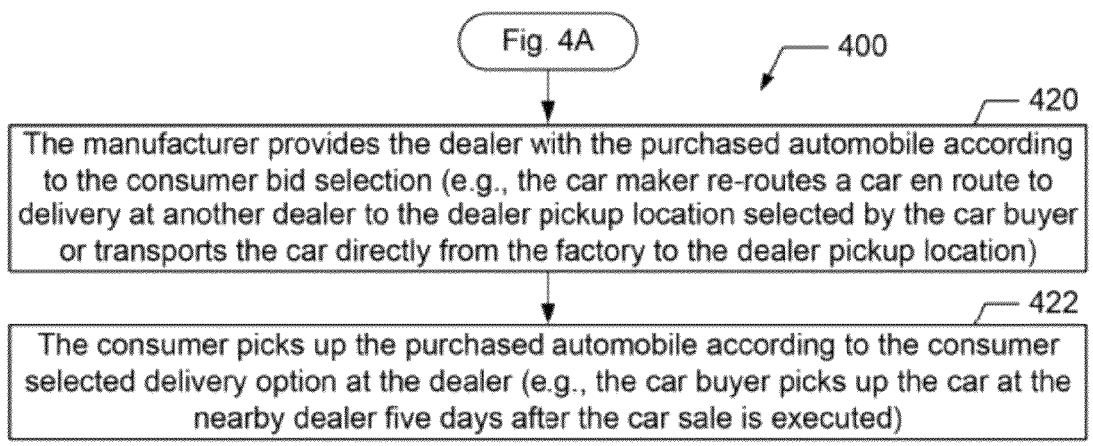

AUTOMOBILE TRANSACTION FACILITATION USING A MANUFACTURER RESPONSE

CROSS REFERENCE TO RELATED APPLICATIONS

This application is related to the co-pending commonly-owned patent application filed on Jul. 5, 2011, entitled "AUTOMOBILE TRANSACTION FACILITATION BASED ON CUSTOMER SELECTION OF A SPECIFIC AUTOMOBILE," the entire contents of which is incorporated by reference herein.

BACKGROUND

In the automobile industry, consumers typically purchase automobiles from dealers or dealerships. Dealers often purchase new automobiles from several manufacturers, to sell to consumers. Consumers typically negotiate a lower price than the manufacturer suggested retail price typically referred to as the "sticker price" and/or the price the dealer initially offers. In many cases, the negotiation process for an automobile may include a large degree of uncertainty for the consumer. Generally, the negotiation process is a zero sum process, and because the consumer and the dealer are each trying to get a better deal, there is typically some lack of trust during the negotiation. Accordingly, both dealers and consumers often base the negotiations on established market prices. However, market prices can fluctuate rapidly depending a variety of factors. For example, consumer demand may be affected by economic factors, such as changes in gasoline prices, unemployment rates, government sponsored tax rebates for automobile purchases, etc.

In many cases, a consumer may have concerns that a dealer may not offer a fair and competitive price. Various products and services have become available that allow consumers to perform research on market prices for automobiles. Similarly, dealers negotiating an automobile sale generally do not know the maximum price a consumer will be willing to pay for a particular automobile, or how long it will take to sell an automobile in inventory for a given price. Accordingly, dealers also use products and services for determining and/or tracking market prices. Further, automobile manufacturers may also have an interest in the market prices for automobiles, because the market activity captured as automobile market information may allow the manufacturer to, for example, more profitably determine which automobiles to manufacture, what prices the manufacture should offer to dealers, and whether manufacturer incentives should be offered on existing dealer automobile inventory.

SUMMARY

The present disclosure provides a new and innovative system, methods and apparatus for providing automobile market information and performing automobile transactions. In an example embodiment, automobile market data representative of recent automobile market characteristics is stored. The automobile market data may include pricing, inventory, and consumer interest information received from manufacturers, dealers, and consumers. A consumer may provide a request for a manufacturer response indicating whether a specific automobile can be provided. Automobile market data may be provided to a manufacturer based on the request and a manufacturer response may provide a verification, confirmation, or offer indicating that the specific automobile can be provided for the consumer. Bids to sell the specific automobile may be requested from dealers based on the manufacturer response. Dealer bids may be provided to the consumer with prices and a delivery options. The consumer may select a bid which specifies a pickup location at a particular dealer.

Additional features and advantages of the disclosed method and apparatus are described in, and will be apparent from, the following Detailed Description and the Figures.

DETAILED DESCRIPTION OF EXAMPLE EMBODIMENTS

The present disclosure relates in general to a system for facilitating automobile transactions and, in particular, to automobile transaction facilitation using a manufacturer response. Briefly, in an example embodiment, a system is provided which allows a consumer to request a verification that a specific car can be obtained. For example, a consumer may use a mobile device to take a picture of a vehicle identification number and using optical character recognition, request real-time information on that automobile. For example, a manufacturer can provide a verification to the consumer and dealers that the automobile can be provided, along with specific logistics for delivery. Dealers may provide bids based on the consumer request and the manufacturer verification, including intrabrand bids and interbrand bids. A consumer may select a dealer bid to purchase or lease an automobile based on the prices and delivery options available. Also, the presently disclosed system may advantageously allow for inventoryless bidding by dealers. For example, a dealer does not need to have an automobile in its inventory (e.g., on the dealer lot), but can make a bid to sell that automobile anyways, and then have that automobile produced by a manufacturer or transported to the dealer lot. In a non-limiting example embodiment, certain features disclosed in the present patent application may be commercially embodied in products and services offered by Sidekick Technology LLC, the assignee of the present application.

Figure 1:
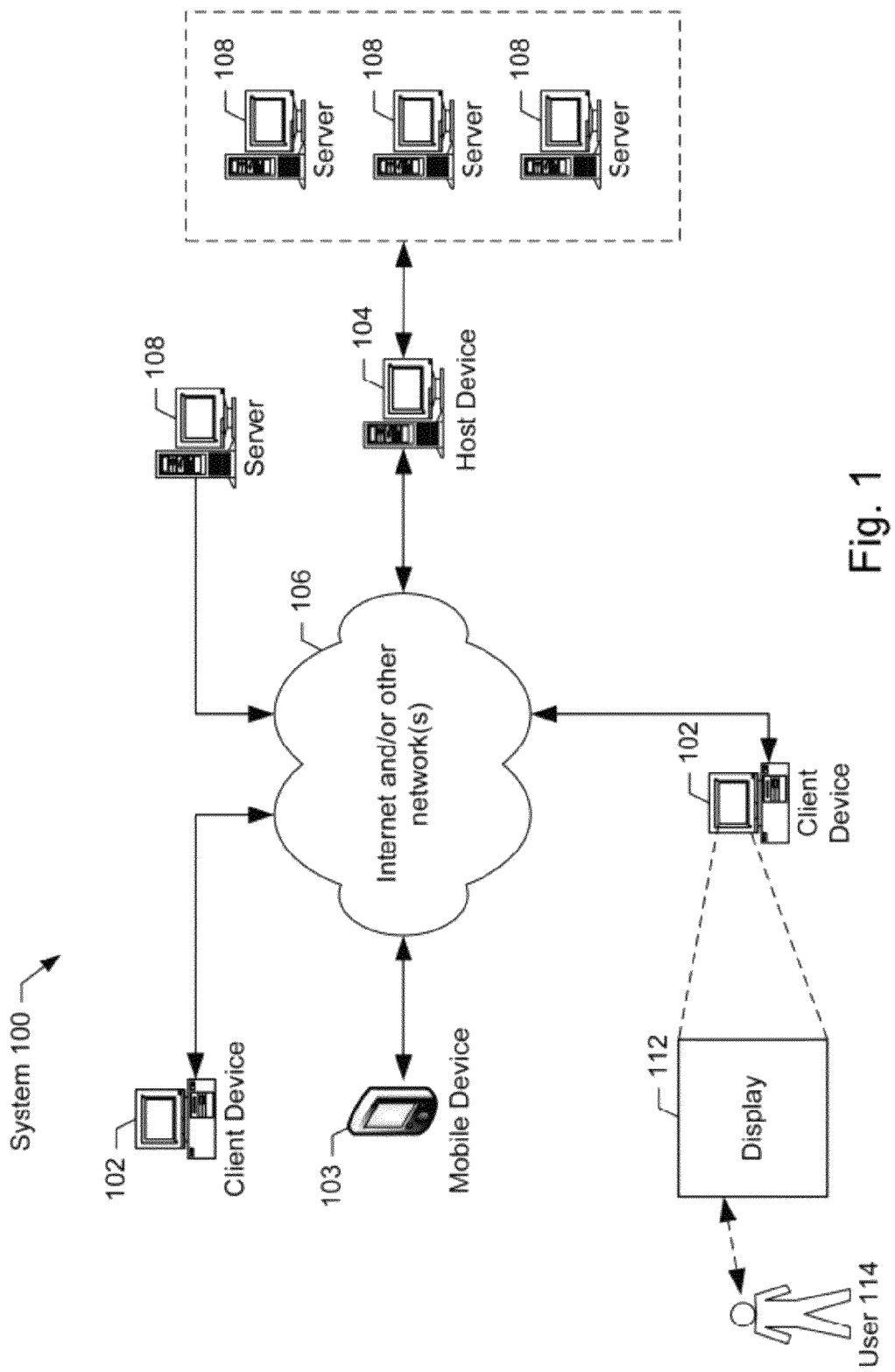
FIG. 1 is a high level block diagram of an example network communicating system, according to an example embodiment of the present invention.

The present system may be readily realized in a network communications system. A high level block diagram of an example network communications system 100 is illustrated in FIG. 1. The illustrated system 100 includes one or more client devices 102, and one or more host devices 104. The system 100 may include a variety of client devices 102, such as desktop computers and the like, which typically include a display 112, which is a user display for providing information to users 114, and various interface elements as will be discussed in further detail below. A client device 102 may be a mobile device 103, which may be a cellular phone, a personal digital assistant, a laptop computer, a tablet computer, etc. The client devices 102 may communicate with the host device 104 via a connection to one or more communications channels 106 such as the Internet or some other data network, including, but not limited to, any suitable wide area network or local area network. It should be appreciated that any of the devices described herein may be directly connected to each other instead of over a network. Typically, one or more servers 108 may be part of the network communications system 100, and may communicate with host servers 104 and client devices 102.

One host device 104 may interact with a large number of users 114 at a plurality of different client devices 102. Accordingly, each host device 104 is typically a high end computer with a large storage capacity, one or more fast microprocessors, and one or more high speed network connections. Conversely, relative to a typical host device 104, each client device 102 typically includes less storage capacity, a single microprocessor, and a single network connection. It should be appreciated that a user 114 as described herein may include any person or entity which uses the presently disclosed system and may include a wide variety of parties. For example, as will be discussed in further detail below, users 114 of the presently disclosed system may include a consumer, a dealer, and/or a manufacturer.

Typically, host devices 104 and servers 108 store one or more of a plurality of files, programs, databases, and/or web pages in one or more memories for use by the client devices 102, and/or other host devices 104 or servers 108. A host device 104 or server 108 may be configured according to its particular operating system, applications, memory, hardware, etc., and may provide various options for managing the execution of the programs and applications, as well as various administrative tasks. A host device 104 or server may interact via one or more networks with one or more other host devices 104 or servers 108, which may be operated independently. For example, host devices 104 and servers 108 operated by a separate and distinct entities may interact together according to some agreed upon protocol.

Figure 2:
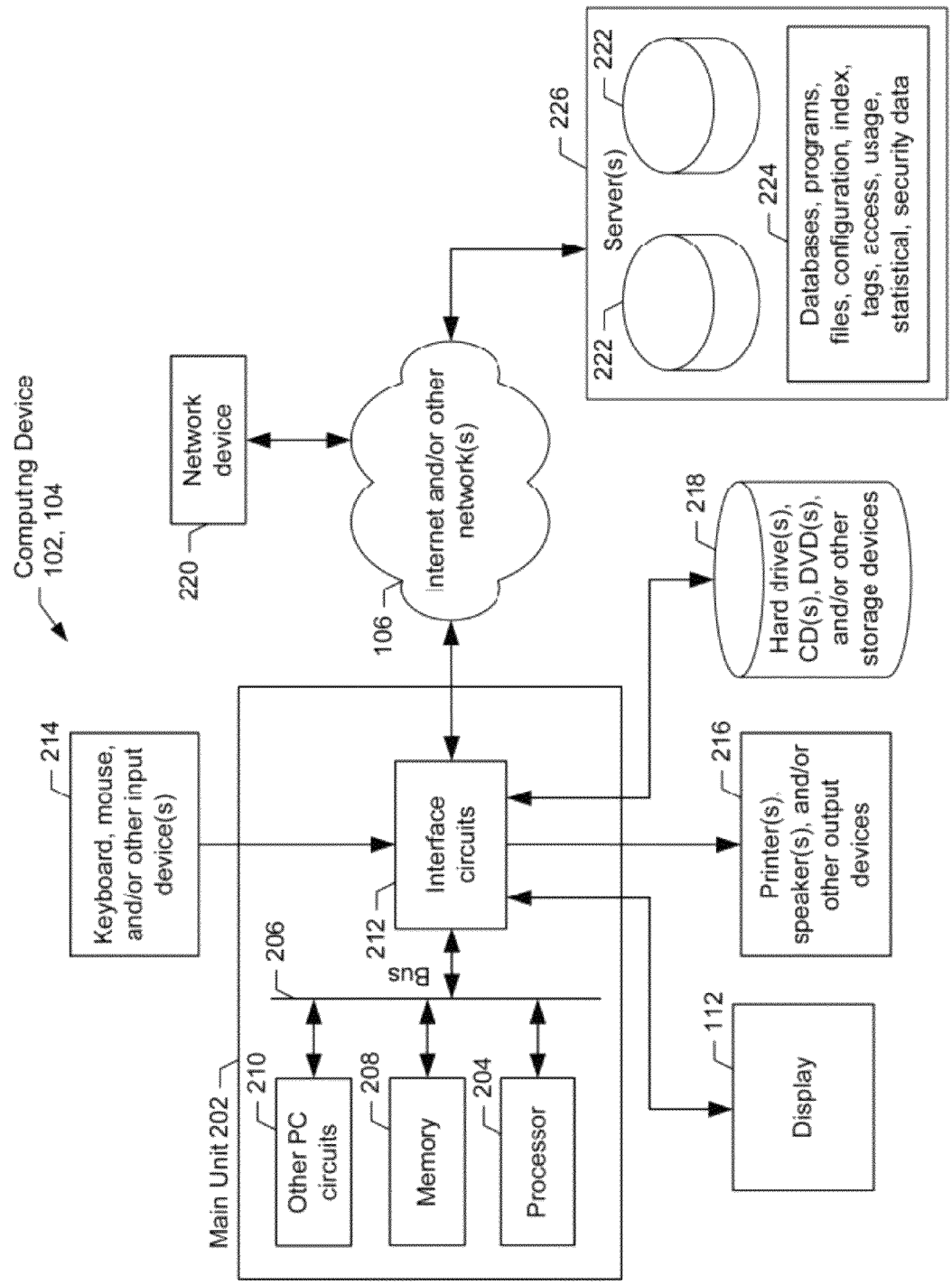
FIG. 2 is a detailed block diagram showing an example of a computing device, according to an example embodiment of the present invention.

A detailed block diagram of the electrical systems of an example computing device (e.g., a client device 102, and a host device 104) is illustrated in FIG. 2. In this example, the computing device 102, 104 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. In an example embodiment, memory 208 may be part of a "cloud" such that cloud computing may be utilized by a computing devices 102, 104. The memory 208 may also store digital data indicative of documents, files, programs, web pages, etc. retrieved from a computing device 102, 104 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, image sensor, character recognition, barcode scanner, and/or a voice recognition system.

One or more displays 112, printers, speakers, and/or other output devices 216 may also be connected to the main unit 202 via the interface circuit 212. The display 112 may be a cathode ray tube (CRTs), a liquid crystal display (LCD), or any other type of display. The display 112 generates visual displays generated during operation of the computing device 102, 104. For example, the display 112 may provide a user interface, which will be described in further detail below, and may display one or more web pages received from a computing device 102, 104. A user interface may include prompts for human input from a user 114 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as pricing data, transaction data, operations data, inventory data, commission data, manufacturing data, image data, video data, audio data, tagging data, historical access or usage data, statistical data, security data, etc., which may be used by the computing device 102, 104.

The computing device 102, 104 may also exchange data with other network devices 220 via a connection to the network 106. Network devices 220 may include one or more servers 226, which may be used to store certain types of data, and particularly large volumes of data which may be stored in one or more data repository 222. A server 226 may include any kind of data 224 including databases, programs, files, libraries, pricing data, transaction data, operations data, inventory data, commission data, manufacturing data, configuration data, index or tagging data, historical access or usage data, statistical data, security data, etc. A server 226 may store and operate various applications relating to receiving, transmitting, processing, and storing the large volumes of data. It should be appreciated that various configurations of one or more servers 226 may be used to support and maintain the system 100. For example, servers 226 may be operated by various different entities, including automobile manufacturers, brokerage services, automobile information services, etc. Also, certain data may be stored in a client device 102 which is also stored on the server 226, either temporarily or permanently, for example in memory 208 or storage device 218. The network connection may be any type of network connection, such as an Ethernet connection, digital subscriber line (DSL), telephone line, coaxial cable, wireless connection, etc.

Access to a computing device 102, 104 can be controlled by appropriate security software or security measures. An individual users' 114 access can be defined by the computing device 102, 104 and limited to certain data and/or actions. Accordingly, users 114 of the system 100 may be required to register with one or more computing devices 102, 104. For example, registered users 114 may be able to request or manipulate data, such as submitting requests for pricing information or providing an offer or a bid.

As noted previously, various options for managing data located within the computing device 102, 104 and/or in a server 226 may be implemented. A management system may manage security of data and accomplish various tasks such as facilitating a data backup process. A management system may be implemented in a client 102, a host device 104, and a server 226. The management system may update, store, and back up data locally and/or remotely. A management system may remotely store data using any suitable method of data transmission, such as via the Internet and/or other networks 106.

Figure 3:
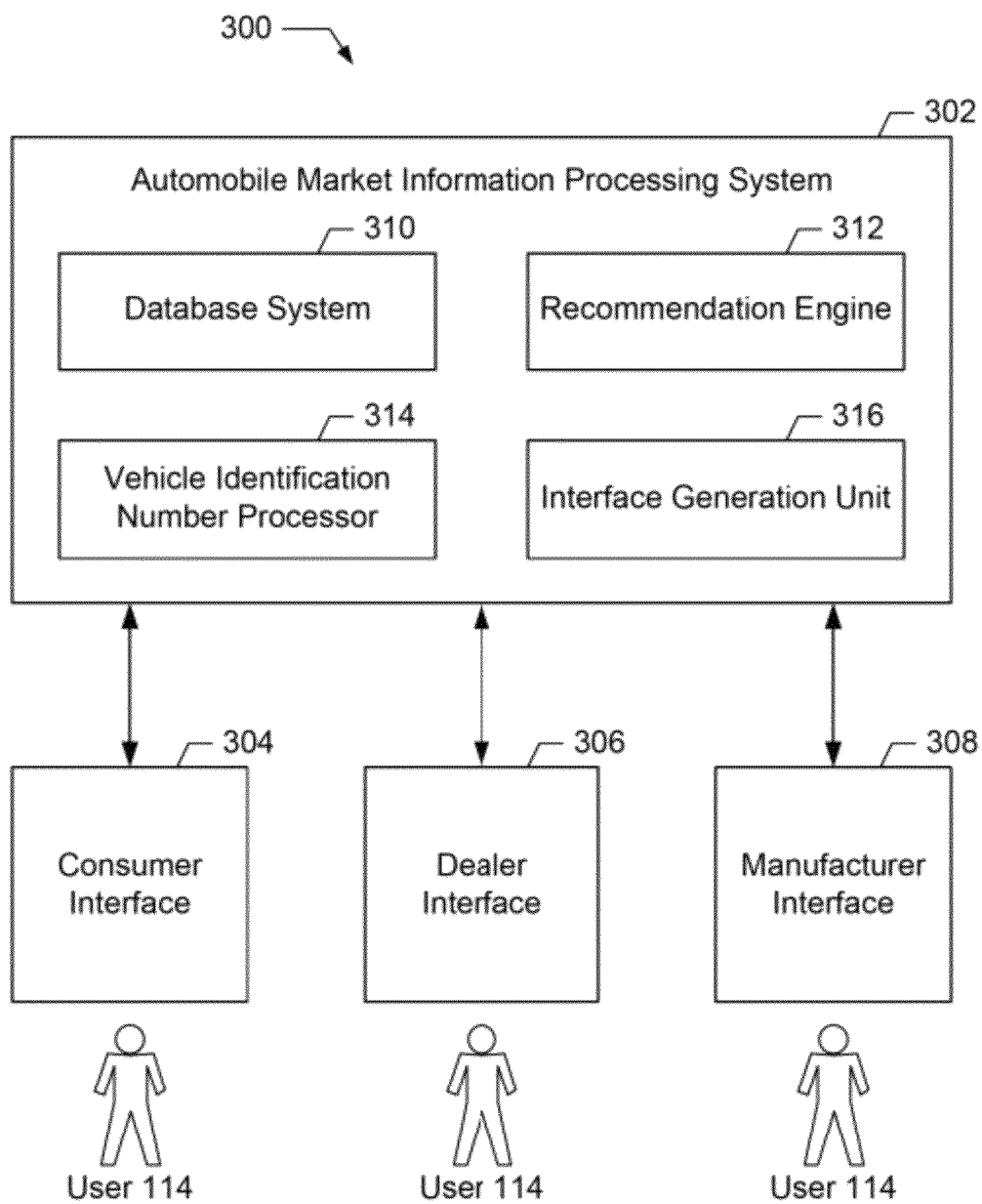
FIG. 3 is a block diagram showing an example automobile transaction network structure, according to an example embodiment of the present invention.

FIG. 3 is a block diagram showing an example automobile transaction network structure 300 which includes an automobile market information processing system 302, a consumer interface 304, a dealer interface 306, and a manufacturer interface 308. The example automobile market information processing system 302 may be implemented on one or more host devices 104 accessing one or more servers 108, 226. In an example embodiment, the automobile market information processing system 302 includes a database system 310, a recommendation engine 312, a vehicle identification number processor 314, and an interface generation unit 316. A user 114 may be a consumer, a dealer, or a manufacturer that interacts with the consumer interface 304, dealer interface 306, or manufacturer interface 308, respectively. A database system 310 may include a wide variety of automobile market data. A recommendation engine 312 may provide recommendations for consumers, dealers, and manufacturers. A vehicle identification number processor 314 may be used for making requests regarding specific automobiles and automobiles with specific sets of features. For example, a vehicle identification number processor 314 may determine a specific set of features that a specific car has based on a picture of that specific car's vehicle identification number. Interface generation unit 316 may provide, for example, HTML files which are used at the consumer interface 304, dealer interface 306, and manufacturer interface 308 interface to provide information to the users 114. It should be appreciated that he the consumer interface 304, dealer interface 306, and manufacturer interface 308 may be considered to be part of the automobile market information processing system 302, however, for discussion purposes, the consumer interface 304, dealer interface 306, and manufacturer interface 308 may be referred to as separate from the automobile market information processing system 302.

For example, a user 114 may interact with a consumer interface 304 to research automobiles the user 114 is interested in buying. For example, a consumer may be looking for a four door sedan with specific features, including a global positioning system (GPS), a sunroof, tinted windows, rated for at least thirty miles per gallon, four wheel drive, etc. The consumer may interact with the consumer interface 304 by inputting required and/or desired features, monthly budget or full price, etc. The consumer interface 304 may provide a wide variety of features and specifications which the consumer may choose from in providing a request. Based on the information put into the consumer interface 304 from the consumer, the consumer interface 304 may provide one or more reports or offers to the consumer. As will be discussed in further detail below, the information provided by the consumer interface 304 may include current market prices for automobiles, including information relating to additional features, and may include information on specific automobiles, for example, which may be en route to a dealer near the consumer's present location. The automobile market information processing system 302 may process data received by the consumer interface 304, as well as the dealer interface 306 and/or the manufacturer interface 308, to respond to a request from a consumer. For example, data from database system 310 may be queried for use in a report, or a recommendation may be provided by recommendation engine 312 according to the consumer request and current market data. The automobile market information processing system 302 may integrate data received from consumer interface 304, dealer interface 306, and manufacturer interface 308 to provide current and accurate information relating to the automobile market.

It should be appreciated that the consumer interface 304 may be specific to one particular manufacturer or may provide information for multiple different manufacturers. For example, a consumer interface 304 may be a website with information on many manufacturers, and further, the consumer interface 304 may access or link to the manufacturer specific websites (e.g., Ford). Also, for example, a consumer interface 304 may be implemented as an automobile manufacturer's website. Typically, a manufacturer's website may provide consumers with a catalog like feature that provides information on different automobile models with any available options or features. For example, a manufacturer website may allow a consumer to select options that are desired to "build" a particular automobile, and may provide price comparisons using suggested retail prices, which may consumers use for initial research into what pricing the dealer may offer for a particular automobile with a particular feature set. Also, typically, the consumer may enter information, including, for example, name, an address or zip code, and telephone number. This information may be passed on from the manufacturer to a nearby dealer and/or nearby dealer information may be provided to the consumer (e.g., the dealer in or nearest to the consumer's entered zip code). Accordingly, the dealer may contact the consumer, or the consumer may inquire with the dealer, regarding the specific automobiles available on that dealer's lot and particular pricing being offered, etc. In many cases, consumers may not inquire with dealers that the manufacturer may recommend, and similarly, dealers may not diligently follow up with consumers that have an interest in purchasing an automobile. Further, it should be appreciated that the information provided via a consumer interface 304 and/or a manufacturer website may be very useful to consumers. For example, in the past, dealers often provided brochures with all the information on a manufacturer's available car models, including all the features and options information. However, dealers typically do not provide comprehensive information brochures, which may be relatively expensive to produce, and rather, that information is typically located on a manufacturer website and/or a consumer interface 304.

Accordingly, the consumer interface 304 may provide a wide range of information, for example, based on any searches or queries performed by a user 114. In an example embodiment, based on a user search or request for a response, the consumer interface 304 will display a quality index or value index based on normalized calculations for an automobile. The recommendation engine 312 may provide recommendations to a consumer based on the current automobile market data stored in the automobile market information processing system 302. For example, metrics on gas mileage, emissions, operating and maintenance costs, safety ratings, etc. may be benchmarked against comparable automobiles of the same and different manufacturers. Similar purchase options to a specific search may also be provided, based on feature matching, price range, consumer popularity, etc. Information including price ranges, including MSRP, invoice prices, inventory levels, the user's 114 credit ratings (e.g., FICO score), may be provided which may include monthly payment estimates or projections. For example, a financing calculator may help a user 114 determine what financing rate is appropriate. It should be appreciated that dealers may mislead consumers into believing that a higher financing rate will be required to secure a loan. Further, for example, a lease vs. buy calculator may be provided which may use current market data including prices, interest rates, incentives, estimated mileage per year, etc. for providing an analysis for a particular consumer regarding purchasing or leasing. Also, the consumer interface 304 may provide a purchase checklist, for example, of ten steps to buying a car. A qualitative checklist may allow a user to ask the right questions and get the right answers from a dealer. Additional tips may be provided, such as a list of products or services dealers may attempt to sell to a consumer with an analysis of the value of these products or services and a recommendation to accept or decline these dealer offers. Further, beyond analysis relating to automobiles, additional analysis or reports may be provided, for example, relating to dealer reviews, other supplemental products, financial entities that may provide financing, etc. For example, dealer reviews may provide a consumer with information the consumer may use in addition to automobile pricing and delivery options. Moreover, the consumer interface 304 may provide a wide variety of useful information to a consumer, for at home research and preparation, and/or in a dealer location while shopping as a negotiating tool that may provide confirmation on pricing, useful tips, and the like.

In an example embodiment, a dealer interface 306 may provide a user 114, such as a dealer employee, information relating to the current automobile market. The dealer interface 306 allows a dealer to interact with automobile market information processing system 302 to provide the dealer with a wide variety of information, including, for example, current market pricing. Other automobile market information a dealer may receive on a dealer interface 306 includes information relating to lot inventory, turnover rates, automobile transportation and/or shipping costs, incentives, and various ratings, such as ratings relating to quality, safety, insurance, a consumer credit score, dealer ratings, residual or resale values, etc. A dealer may input information into dealer interface 306 relating to sales data, including current pricing offered, special sales offers, actual transaction data, inventory data, etc. In an example embodiment, the dealer may provide information through dealer interface 306 which will be used by automobile market information processing system 302 to prepare reports or offers to consumers and/or manufacturers. It should be appreciated that a dealer is typically a franchise entity, while a distribution location may not be a franchise entity. For brevity, throughout this specification, the term dealer may be used to describe both franchise entity dealers and non-franchise entity distribution location. Accordingly, as used in this disclosure, the term dealer does not indicate whether an entity is a franchise entity. Moreover, a franchise dealer or a non-franchise distribution location may utilize a dealer interface 306 as described herein.

In an example embodiment, a manufacturer interface 308 may provide a user 114, such as a manufacturer employee, information relating to the current automobile market, including consumer requests. For example, an manufacturer interface 308 may provide a manufacturer a request received from a consumer interface 304. Additionally, the manufacturer interface 308 may provide information such as a report that allows the manufacturer to provide a response to the requesting consumer. A report may include information from database system 310 relating to current market pricing, recent sales figures and trends, current manufacturer incentives, current inventory, including dealer inventory, inventory in transit, and/or build times or lead times for a desired automobile, etc. The manufacturer may use this information to provide a response to a consumer request. The manufacturer may provide the manufacturer interface 308 with information to provide a confirmation, a verification, or an offer to a consumer via consumer interface 304. For example, a confirmation number associated with the particular consumer request may be provided for the consumer. Also, a recommendation may be provided from the recommendation engine 312 to the manufacturer in relation to automobile pricing, responding to a specific request, manufacturer incentives, inventory management, production schedules, shipping schedules, etc. It should be appreciated that a manufacturer may be referred to as an OEM or original equipment manufacturer. The manufacturer interface 308 may provide a manufacturer with a real-time lens into the automobile market which may allow the manufacturer to adjust production schedules, pricing plans, marketing activities, etc., which may provide a significant advantage for manufacturers.

Accordingly, information may be provided to the automobile market information processing system 302 from consumers, dealers, and manufacturers with a very high degree of granularity, as every transaction that occurs and even every request or search may be stored and used by the automobile market information processing system 302. This allows the automobile market information processing system 302 to use the most current automobile market data to provide information to consumers, dealers, and manufacturers. It should be appreciated that market prices can change relatively quickly, particularly when major events drive consumer behavior or manufacturer production, such as natural disasters. Accordingly, reports and recommendations provided by the automobile market information processing system 302 may be highly accurate, reliable, and sensitive to market changes.

It should be appreciated that certain functions described as performed, for example, at automobile market information processing system 302, may instead be performed locally at consumer interface 304, dealer interface 306, and manufacturer interface 308, or vice versa. Further, in certain cases, tasks may be performed using consumer interface 304, dealer interface 306, and manufacturer interface 308 or, for example, performed in person, such as a consumer signing documents at a dealer location, or a dealer communicating with a manufacturer using a telephone. It should be appreciated that the consumer interface 304, dealer interface 306, and manufacturer interface 308 may be implemented, for example, in a web browser using an HTML file received from the automobile market information processing system 302. In an example embodiment, the consumer interface 304, dealer interface 306, and manufacturer interface 308 may be located on a website, and may further be implemented as a secure website. Also, consumer interface 304, dealer interface 306, and manufacturer interface 308 may require a local application, for example, which a manufacturer may pay for to have access to, for example, information from the automobile market information processing system 302 such as requests from consumers.

Figure 4A:
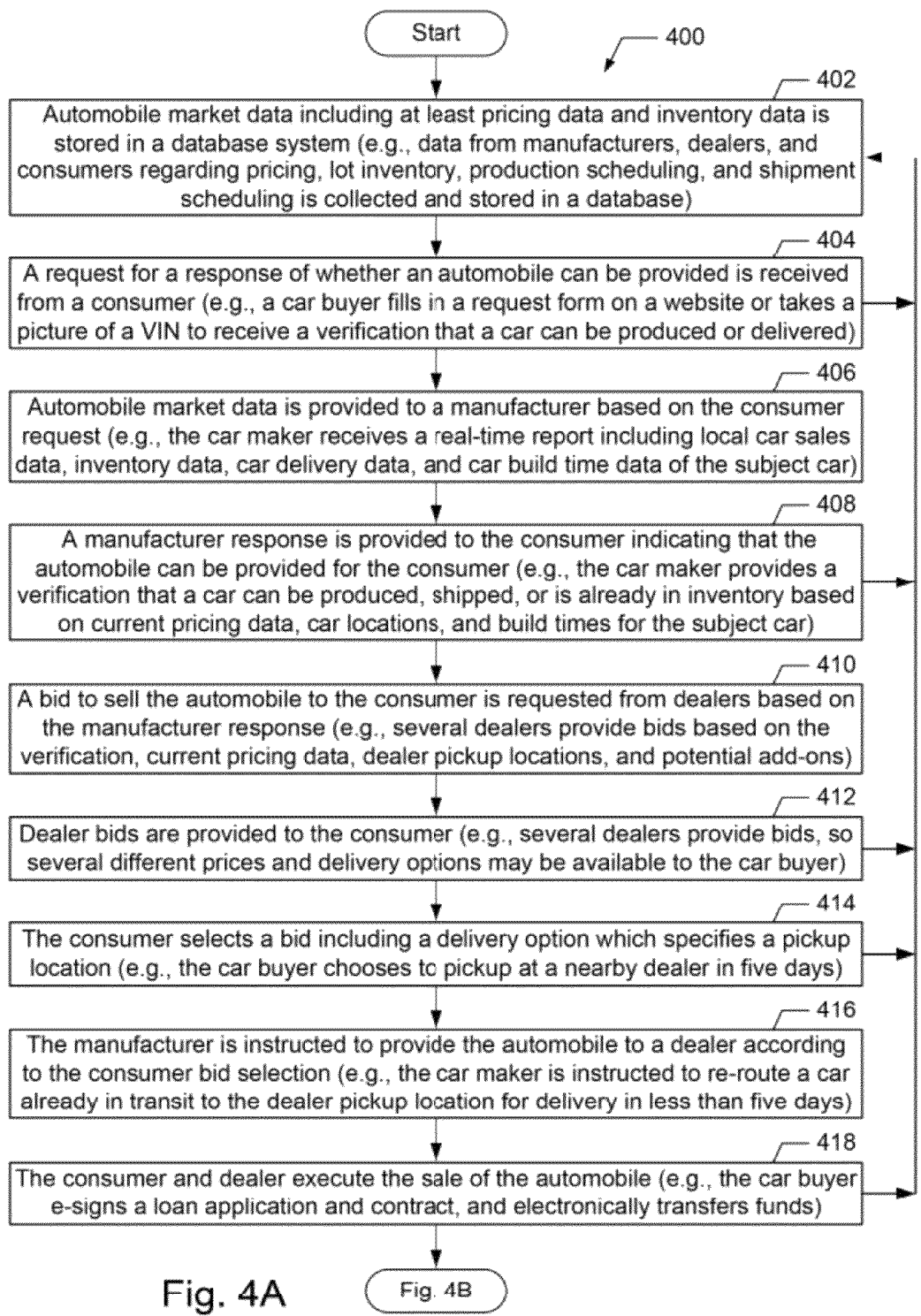
FIG. 4 includes a flowchart illustrating an example process for facilitating an automobile transaction, according to an example embodiment of the present invention.

FIG. 4 is a flowchart of an example process 400 for facilitating an automobile transaction. Although the process 400 is described with reference to the flowchart illustrated in FIG. 4, it will be appreciated that many other methods of performing the acts associated with the process 400 may be used. For example, the order of many of the blocks may be changed, certain blocks may be combined with other blocks, and many of the blocks described are optional.

The example process 400 for facilitating an automobile transaction may allow users 114, including manufacturers and consumers, as well as dealers, to efficiently sell and purchase automobiles, respectively. The example process 400 may begin with automobile market data including at least pricing data and inventory data stored in a database system (block 402). For example, automobile market data from manufacturers, dealers, and consumers regarding pricing, lot inventory, production scheduling, and shipment scheduling is collected and stored in a database. In an example embodiment, a wide variety of data is stored in a database system 310. Automobile market data may include various relevant ratings, reports, awards, or other information, including quality information, safety information, insurance information, consumer credit information, dealer rating information, incentive information, residual value information, and/or any other data which may be relevant to consumers. For example, ratings data may include information from the National Highway Traffic Safety Administration (NHTSA), the Environmental Protection Agency (EPA), and/or the Insurance Institute for Highway Safety (IIHS). The data may include information from a consumer interface 304, such as data in consumer searches or requests, information from a dealer interface 306, such as currently offered dealer pricing, transaction data for finalized sales, current inventory data, shipping costs, and information from a manufacturer interface 308, such as current manufacturer prices and suggested pricing, manufacturer incentives, and current inventory including finished inventory on hand, production scheduling, shipment scheduling, inventory in transit, and manufacturing lead times. The automobile market data may be comprised solely of information received from the consumer interface 304, dealer interface 306, and manufacturer interface 308, or may include additional information received from other sources. It should be appreciated that various methods of storing the automobile market data may be employed according to the system requirements. For example, database system 310 may be organized according to different manufacturers, automobile make and model, different information categories (e.g., suggested pricing, market prices, production, shipping, lot inventory), etc., and may consist of one or more databases on one or more servers 108, 226 which may be remotely located from each other and/or a host device 104 of the automobile market information processing system 302. As will be discussed further below, the automobile market data may be continually updated as new data is provided to the automobile market information processing system 302.

The example process 400 continues with a consumer providing a request to a manufacturer for a response of whether an automobile can be provided (block 404). For example, a car buyer fills in a request form on a website to receive a verification that a car can be produced or delivered. In this example embodiment, the buyer's request may be transmitted from consumer interface 304 via the internet to the automobile market information processing system 302. In another example embodiment, a car buyer may be located at a dealer location and take a picture of a vehicle identification number (VIN) on a car that the buyer would like to receive information for. For example, using an application stored on a mobile device 103, the buyer may take a picture of the VIN on a car. The buyer may want information on that specific car or on other comparable cars with the same or similar features and/or options. The picture of the VIN may be processed using optical character recognition, which allows the automobile market information processing system 302 to determine the make and model of the car, along with various other characteristics of the car. It should be appreciated that the VIN may include human readable characters, a bar code, or any other graphical or machine readable information which acts as a vehicle identification number. Accordingly, the buyer may perform research, for example, while at home or while shopping at a dealer location. Further, for example, the buyer may take a picture of a VIN anywhere, including at automobile trade shows, mall displays, or anywhere new cars or cars for sale are displayed. The buyer may even take a picture of a car parked in the street as the buyer walks down the street. Any request or query communicated from the consumer interface 304 may be stored, for example, in database system 310, thereby updating the automobile market information processing system 302 with current automobile market data.

The example process 400 may continue with providing automobile market data to a manufacturer based on the consumer request (block 406). For example, the car manufacturer receives a real-time report including local car sales data, inventory data, car delivery data, and car build time data of the consumer's requested car. In an example embodiment, a report may include quality information, safety information, insurance information, consumer credit information (e.g., buyer FICO score), dealer rating information, incentive information, residual value information, and/or any other data which may be relevant to consumers. The report may be provided through manufacturer interface 308 and include the consumer requirements and preferences. The request and/or the report may be provided in real-time and may provide real-time data. Data reported based on a real-time updates in the automobile market information processing system 302 may provide significant advantages, for example, when pricing conditions may change quickly due to unforeseen market conditions. The recommendation engine 312 may provide recommendations to a manufacturer based on the current automobile market data. For example, a report may indicate various estimated sales probabilities for different prices that a dealer may offer or bid, which can be very useful information for a manufacturer. In an example embodiment, a probability for a manufacturer or dealer to sell a certain lot of automobiles within a time frame may be provided. Such information may be illustrated in various ways, such as a bell curve graph or a chart. Further, the recommendation engine may provide suggestions regarding manufacturer incentives or other factors which affect the automobile market. Manufacturers may use such information in making important decisions, such as setting pricing, setting or modifying production schedules, marketing directives, future product features and focus, and the like. Also, in an example embodiment, the manufacturer interface 308 may provide information that is limited to cars which meet the consumer request requirements. The manufacturer may customize the manufacturer interface 308 to provide information in a pre-specified manner to suit the manufacturers needs.

A manufacturer response is provided to the consumer indicating that the automobile can be provided for the consumer (block 408). For example, the car maker provides a verification that a car can be produced, shipped, or is already in inventory based on current pricing data, car locations, and build times for the subject car. The manufacturer interface 308 may be used to communicate a verification, or a confirmation or offer to a buyer. For example, a verification may state that a particular car with specific features may be produced within forty-five days if the buyer purchases that car and may provide a confirmation number associated with the verification. In another example, a particular car currently being shipped to New York may be re-routed to Illinois. The automobile market data may include, for example, shipping costs that the manufacturer may use for determining if an automobile should be re-routed. An offer to produce or ship a particular car to a dealer location near a consumer may be authorized through the manufacturer interface 308. In an example embodiment, the automobile market information processing system 302 may be pre-authorized by a manufacturer to provide a confirmation of specific model with specific feature sets. A manufacturer may determine whether it is profitable to produce a car from scratch based on the automobile market data such as current market pricing, current inventory levels, and the like. Accordingly, a manufacturer response may be adjusted by current automobile market conditions. In an example embodiment, a manufacturer response may not require the use of manufacturer interface 308, for example, a manufacturer may otherwise provide a consumer with a verification, which may be provided by the consumer for use in the automobile market information processing system 302. Any verification, confirmation, offer, and/or response communicated from a manufacturer interface 308 may be stored, for example, in database system 310, to further update the automobile market information processing system 302 with current automobile market data.

Then, a bid to sell the automobile to the consumer is requested from dealers based on the manufacturer response (block 410). For example, several dealers provide bids based on the verification, current pricing data, dealer pickup locations, and potential add-ons. Each dealer's bid may include a price, for example, a price with no additional add-on products or services, such as service contracts, warranties, aftermarket accessories, etc. For example, add-on products may provide substantial value to a dealer, above and beyond the profit margin for the sale of the requested car. A dealer may profit from selling financing options, for example, if a consumer needs financing, the financier may pay the dealer for sourcing the loan. A dealer may sell service plans or maintenance packages (e.g., an extended service contract), selling warranties (e.g., a lifetime warranty), or selling insurance plans (e.g., life, accident, and health insurance, liability insurance, comprehensive insurance, etc.). Also, a dealer may also sell various hard add accessories, for example, bicycle racks, hitches, commercial accessories (e.g., lights and sirens), or any aftermarket products or modifications (e.g., sunroof).

One or more dealer bids are provided to the consumer (block 412). For example, several dealers provide bids, so several different prices and delivery options may be available to the car buyer. Typically, the bid will include at least a specified price and pickup time and location. Typically, a pickup location will be a dealer lot or distribution location. In an example embodiment, a buyer that has taken a picture of a VIN with a mobile device may receive dealer bids within minutes or seconds on the mobile device. Accordingly, the bids may be used in real-time as the buyer may be actively shopping for a car on a dealer lot. It should be appreciated that some dealers may have multiple locations which could serve as a pickup location. In an example embodiment, the automobile market data may indicate that the particular car requested by a consumer should be priced at, for example, $26,000. However, various factors may affect the bid or offer that a dealer will make for the particular car. For example, the potential for forming a customer relationship, the value of potential add-on products and services, or competition with other dealers may cause a dealer to bid lower than normal. In such a case, the dealer may bid $25,000 in an effort to create a customer relationship, sell add-on products, and/or undercut the competition pricing. Other factors, such as the buyer's credit score (e.g., FICO score), may be used by a dealer in determining a bid, as this may affect the profitability of a sale.

Further, for example, the particular automobile requested may not be available for immediate pickup near the buyer, and various alternative delivery options may be provided from several dealers' bids. A car that is in transit to an out of state dealer may be re-routed to a dealer near the buyer, or a new car may be built to the buyer's desired specifications and delivered to a dealer near the buyer. Therefore, for example, the consumer interface 304 may provide several different bids with different delivery options and prices to the buyer, for example, a price of $26,000 to pick up the car at an out of state dealership the next day, a price of $26,000 to pick up the car at a local dealer in two months, or a price of $26,500 to pick up the car at a local dealer in five days. For example, the costs of re-routing a car already in shipment may be factored into dealer bids. Inventoryless bidding may be highly beneficial when dealers that do not have a requested automobile in inventory can still profitably provide a bid. Further, for example, cars that are not exactly what the buyer requested may also be offered to the buyer. For example, the buyer may request a four wheel drive car, but if a two wheel drive car that meets all the other buyer criteria is immediately available at a nearby dealer, the dealer may provide an offer to the buyer for this car, possibly at a significantly lower price, such as $23,000 instead of $26,000 for a four wheel drive car as requested. Further, for example, dealers may use information such as ratings data to optimize their bids. For example, if gasoline prices are increasing, mileage ratings for a particular car may dictate increasing or decreasing a bid. If a vehicle has very good gas mileage, and gas prices are skyrocketing, that car may have an increasing demand as gas prices increase, or vice versa. Similarly, safety ratings of vehicles may be important to consumer demand if high profile problems have appeared for a particular automobile style, make, or model. As discussed above, various automobile market information may be used by a dealer including safety information, insurance information, consumer credit information, dealer rating information, incentive information, residual value information, and/or any other data which may be relevant to consumers.

The consumer interface 304 may organize dealer bids based on a variety of factors and may provide supplemental information. For example, certain dealer bids may be selected as the best options, all dealer bids may be summarized, various additional ratings, reviews, or popularity information, financing information, etc. may also be provided to a consumer along with any dealer bids. The recommendation engine 312 may provide recommendations to a consumer based on the current automobile market data. For example, of ten dealer bids provided with a response, three bids may be recommended, for example, as "Great Deals!" It should be appreciated that in some cases, a particular consumer search may not return any dealer bids, for example, if consumer search requirements are unrealistic for the consumer's required price range. Also, for example, if only one or two bids are received, the recommendation engine 312 may recommend that a consumer wait for a better bid because the bids provided are not competitive offers based on the current automobile market data stored in the database system 310. Further, in an example embodiment, dealer bids may be organized according to distance to a dealer pickup location, lowest price, closest match to the consumer entered criteria, a normalized quality index or value index, etc. The consumer may be able to toggle between different viewing options for dealer bids or search results.

Further, in an example embodiment, a buyer may be at a dealer lot (e.g., a Nissan dealer) and take a picture of a VIN on a car (e.g., a Maxima). A bid from a competing dealer (e.g., a Toyota dealer) across the street may be received on the mobile device within seconds and include information for a comparable car (e.g., an Avalon) relating to, for example, gas mileage, safety ratings, price comparisons, residual value, driving directions to the competing dealer, etc. In an example embodiment, a dealer may use the geolocation of the buyer, such as in instances when the buyer is physically located close to the dealer. Accordingly, competing dealer bids may be interbrand or intrabrand in nature, and may be tailored to the buyer's particular situation, which a consumer may find highly advantageous. For example, the buyer may have a bid for a car the buyer wants to test drive as well as a bid for a comparable car across the street before a salesman from the dealer even introduces himself. Accordingly, a consumer may weigh the pros and cons of various dealer bids, based on delivery options, pricing, and any other relevant variants. Any bids communicated from a dealer interface 306 may be stored, for example, in database system 310, to further update the automobile market information processing system 302 with current automobile market data.

The consumer selects a bid including a delivery option which specifies a pickup location (block 414). For example, the car buyer chooses a delivery option of picking up the car at a nearby dealer in five days. As noted above, a dealer may be a franchise dealer entity or a non-franchise distribution location. The buyer may select an offer with a specified delivery option on the consumer interface 304. The car buyer may have been weighing two or more different delivery options and/or different features, price differences, etc., based on the response(s) received through the consumer interface 304. As noted above, the consumer interface 304 may organize bids and other helpful information in a variety of ways, which may make the information easier for a consumer to digest. It should be appreciated that a buyer will typically want to pick up a new car at a convenient location, often near the buyer's home. Accordingly, dealers may attempt to provide delivery options tailored towards maximizing profit for the dealer while also maximizing convenience to the buyer, while also providing a superior bid to other dealers. By providing multiple bids with different delivery options, the buyer may be allowed to save time or money based on the buyer's particular needs. In an example embodiment, the buyer may provide a counter offer or different request via the consumer interface 304 to a dealer via the dealer interface 306. Accordingly, the dealer may respond in kind, and may update delivery options or other terms. It should be appreciated that the consumer selection of a bid may, for example, occur simultaneously with the consumer executing the sale or providing a deposit or down payment, or the like (see, e.g., block 418). Accordingly, in an example embodiment, once the buyer selects a bid, the buyer has effectively purchased the car, and the dealer does need to worry about the buyer backing out of the deal. Any consumer selections, counter offers, or additional requests or responses may be stored in database system 310, as the communications are processed by automobile market information processing system 302, providing further data updates. Accordingly, in an example embodiment, a consumer may select a bid to purchase a car, and that purchase information may then be provided to another consumer searching for the same type of car with similar features, for example, the next day.

Once a bid with a specific delivery option has been selected, the manufacturer is instructed to provide the automobile to a dealer according to the consumer bid selection (block 416). For example, the car maker is instructed to re-route a car already in transit to the dealer pickup location for delivery in less than five days. In an example embodiment, the dealer may be required to send an instruction message from the dealer interface 306 to the manufacturer interface 308. It should be appreciated that the specific manner of instruction may be changed based on the particular application, for example, the automobile market information processing system 302 may automatically provide an instruction to a manufacturer to produce a car or re-route a car. It should also be appreciated that particular events may be required to trigger instructing a car to be delivered to a dealer, such as a deposit, financing approval, etc. Further, the consumer may be required to send an instruction message from the consumer interface 304 to the manufacturer interface 308 affirming that the buyer has agreed to purchase the car from the dealer.

The consumer and the dealer execute the sale of the automobile (block 418). For example, the consumer electronically signs documentation such as loan application and a contract and performs an electronic funds transfer or credit card payment. After the delivery option is selected, an electronic contract may be provided by the manufacturer for the buyer who may e-sign the contract, and/or any other loan applications or other documentation as needed. In another example embodiment, paper copies of a contract may be signed, for example, after the buyer prints them or receives them from a nearby dealer or through the mail. In an example embodiment, the buyer may provide cash or a paper check. It should be appreciated that the process of executing a contract may take some time. For example, the process may occur in several steps, as loan processing may be required prior to executing a contract for sale of a car. Also, it should be appreciated that, for example, the consumer selection of a bid discussed above (see, e.g., block 414) may occur simultaneously with the consumer executing the sale. Once the sale is completed, the actual transaction data including the final negotiated price, may be provided to and stored in database system 310. Accordingly, the automobile market information processing system 302 may be updated with current automobile market data from every step in the negotiation process between a consumer and a manufacturer. In an example embodiment, the updates provided to the automobile market information processing system 302 are provided in real-time, for example, data may be transmitted and processed within seconds or minutes. Further, for example, it should be appreciated that certain data may be provided to the automobile market information processing system 302 according to a batch processing schedule.

Next, the manufacturer provides the dealer with the purchased automobile according to the consumer bid selection (block 420). For example, the car maker re-routes a car en route to delivery at another dealer to the dealer pickup location selected by the car buyer or transports the car directly from the factory to the dealer pickup location. If a buyer chooses a quicker delivery option, the car may need to be re-routed from a different destination to the selected dealer pickup location. If a buyer does not urgently need to have a car, a new car may be built to the buyer's exact specifications and delivered to the selected dealer pickup location. Also, for example, a purchased car may be already at a dealer which the buyer has agreed to pick the car up, in which case, the car does not need to be provided to the dealer. A dealer may interact with the automobile market information processing system 302 using dealer interface 306, for example, to receive notification that a car will be picked up by a buyer, and to report that a car has been delivered to the dealer. A notification may also be sent via consumer interface 304 to the buyer that the car is available for pickup at the specified dealer.

Finally, the consumer picks up the purchased automobile according to the consumer selected delivery option at the dealer (block 422). For example, the car buyer picks up the car at the nearby dealer five days after the car sale is executed. The buyer may pick up the car without ever having to talk to or negotiate, in person or over the telephone, with the dealer. For example, the buyer may arrive at the dealer, show identification and proof of purchase, and be provided the keys to the car. The buyer may sign paperwork indicating the car has been picked up. Also, the dealer may offer or provide additional products or services to the buyer when the buyer goes to the dealer to pick up the car. For example, the dealer may offer financing options, warranties, service plans, insurance plans, and hard add accessories to the buyer, as discussed in further detail above.

Accordingly, it should be appreciated that manufacturers, consumers, and dealers may receive significant benefits from the method of facilitating an automobile transaction disclosed herein. For example, production scheduling, price setting, inventory management, may be greatly improved for manufacturers and dealers by utilizing the disclosed system and method. Consumers may benefit from more competitive pricing, piece of mind knowing that a fair market price is being offered for prospective purchases, and improved delivery options that allow the consumer to weigh the benefits and drawbacks of different delivery options, pricing, and other variables. In an example embodiment, consumers can view prices paid for comparable cars in specific locations based on the automobile market data in the automobile market information processing system 302, for example, within a certain time frame such as one month and within a certain proximity to the consumer. Moreover, various inefficiencies in the automobile industry may be minimized utilizing the presently disclosed system and method.

Figure 5:
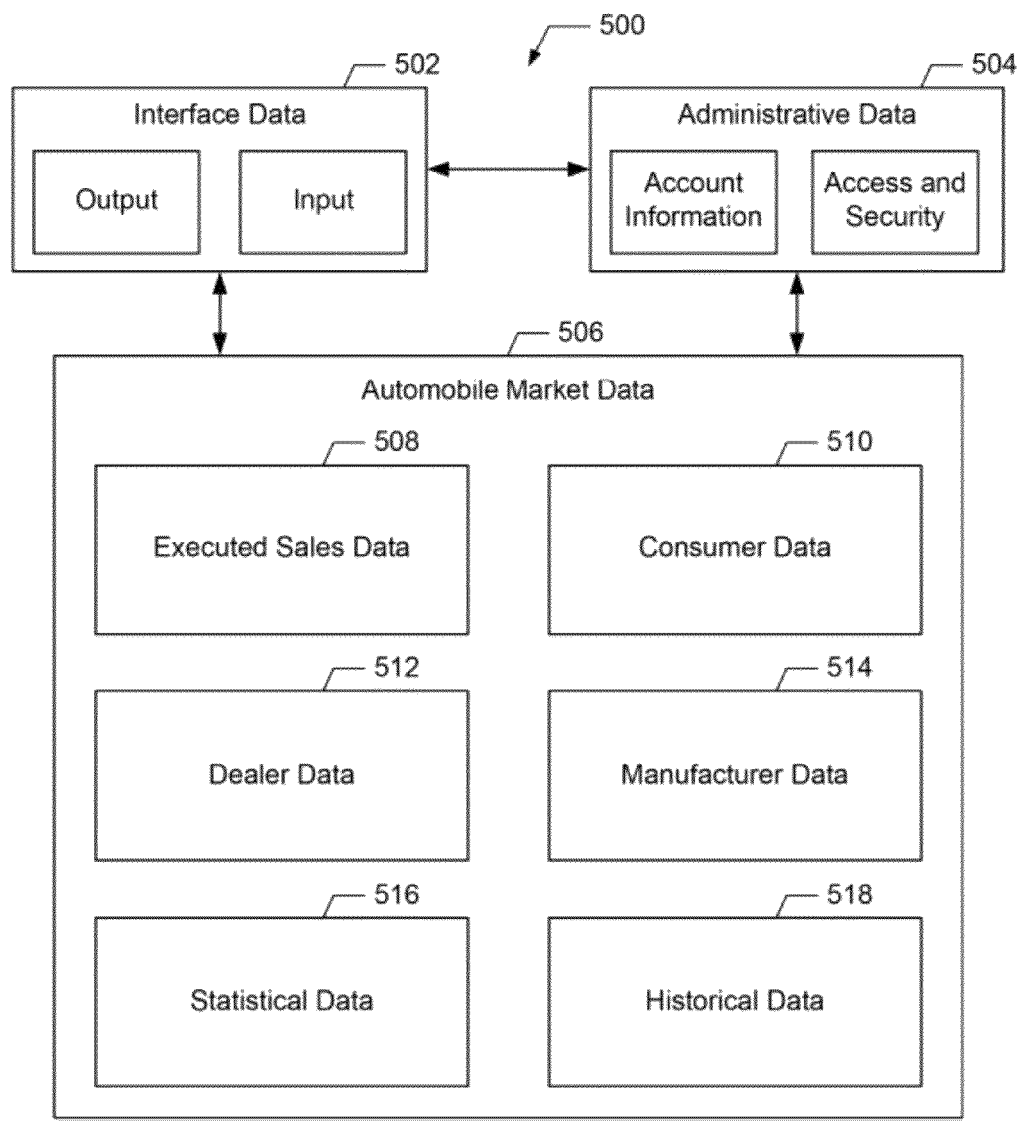
FIG. 5 is a block diagram showing an example data architecture, according to an example embodiment of the present invention.

FIG. 5 illustrates a block diagram of an example data architecture 500. In the example data architecture 500, interface data 502, administrative data 504, and automobile market data 506 interact with each other, for example, based on user commands or requests. The interface data 502, administrative data 504, and automobile market data 506 may be stored on any suitable storage medium (e.g., server 226). It should be appreciated that different types of data may use different data formats, storage mechanisms, etc. Further, various applications may be associated with processing interface data 502, administrative data 504, and automobile market data 506. Various other or different types of data may be included in the example data architecture 500.

Interface data 502 may include input and output data of various kinds. For example, input data may include mouse click data, scrolling data, hover data, keyboard data, touch screen data, voice recognition data, etc., while output data may include image data, text data, video data, audio data, etc. Interface data 502 may include data relating to formatting, user interface options, links or access to other websites or applications, and the like. Interface data 502 may include applications used to provide or monitor interface activities and handle input and output data.

Administrative data 504 may include data and applications regarding project data or data related to project compensation. For example, administrative data 504 may include information used for updating accounts, such as creating or modifying manufacturer accounts or dealer accounts. Further, administrative data 504 may include access data and/or security data. Administrative data 504 may interact with interface data in various manners, providing a user interface 304, 306, 308 with administrative features, such as implementing a user login and the like.

Automobile market data 506 may include, for example, executed sales data 508, consumer data 510, dealer data 512, manufacturer data 514, statistical data 516, and/or historical data 518. Executed sales data 508 may include actual negotiated prices for manufacturer and dealer sales, differences in list prices to negotiated prices, sales demographics, etc. Consumer data 510 may include consumer search activity, consumer requests and offers, consumer feedback, etc. Dealer data 512 may include dealer pricing, including list prices, sale prices for limited time dealer offers or deals of the day, negotiation information such as bottom line pricing, offers received, foot traffic activity, and dealer inventory data, including current on location data, automobile turnover rates, etc. Manufacturer data 514 may include manufacturer pricing, including suggested pricing, preferred dealer pricing, etc., manufacturer incentives including cash rebates, special lease rates, special APR rates, zero down offers, lifetime warranties, guaranteed trade-in offers, etc., and inventory information including dealer inventory, inventory by location, inventory in transit, manufacturing or production lead times or build times, production scheduling, shipping scheduling, etc. Statistical data 516 may include information used for providing reports including graphs, forecasts, recommendations, calculators, depreciation schedules, tax information, etc., including equations and other data used for statistical analysis. Historical data 508 may include past sales data, such as historical list prices, actual sale prices, manufacturer and dealer margins, operating costs, service costs or profitability, loyalty information, etc. It should be appreciated that data may fall under multiple categories of automobile market data 506, or change with the passage of time. It should also be appreciated that automobile market data 506 may be tailored for a particular manufacturer or dealer, for example, a manufacturer may request that a specific type of data that is not normally stored or used be stored in the database system 310. Accordingly, for example, customized reports may be provided to a manufacturer interface 308 using that specific data for the manufacturer.

The integration of the various types of automobile market data 506 received from the consumer interface 304, dealer interface 306, and manufacturer interface 308 may provide a synergistic and optimal resource for consumers, dealers, and manufacturers alike. In an example embodiment, a consumer may benefit greatly from using an application in a mobile device 103 to receive both intrabrand information and interbrand information in real-time, based only on taking a picture of VIN. Dealers and manufacturers may be able to provide information to the consumer in a manner that highlights the benefits of the products the respective dealer or manufacturer would like to sell. The intrabrand and interbrand information provided on a consumer interface 304 may allow the best automobile options for a particular consumer to be provided to that consumer, may allow manufacturers to better follow through with opportunities for sales, and may allow dealers to compete with other dealers taking into account a greater amount of automobile market information, all of which may result in a more efficient automobile market.

Automobile market data 506 may be maintained in various servers 108, in databases or other files. It should be appreciated that, for example, a host device 104 may manipulate automobile market data 506 in accordance with the administrative data 504 and interface data 502 to provide requests or reports to users 114 including consumers, dealers, and manufacturers, and perform other associated tasks. It should also be appreciated that automobile market data 506 represents automobile market information, and that these terms may be used interchangeably in this disclosure depending upon the context.

Figure 6:
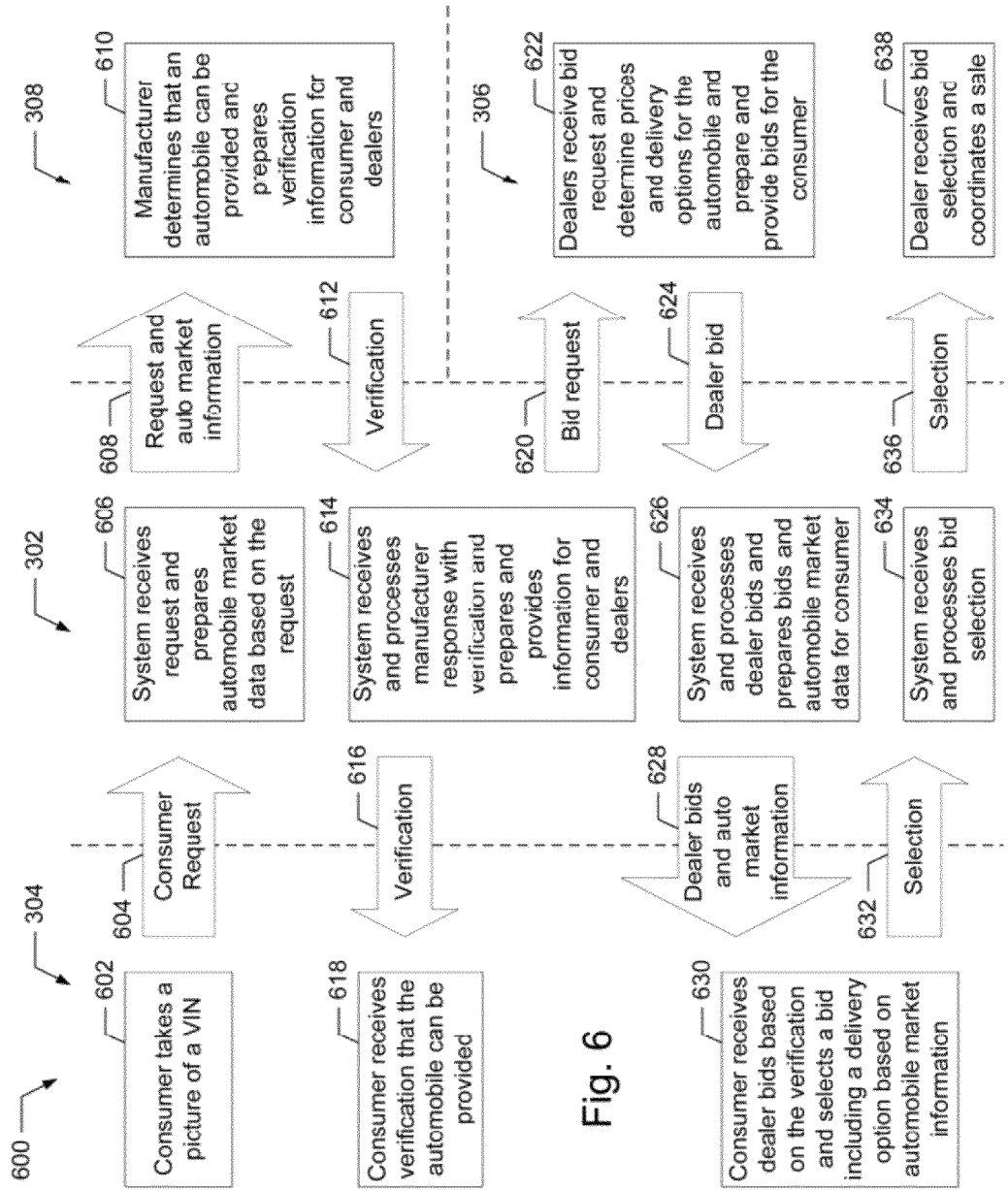
FIG. 6 is flow diagram illustrating an example process for facilitating an automobile transaction, according to an example embodiment of the present invention.

FIG. 6 is flow diagram illustrating an example process 600 for facilitating an automobile transaction, according to an example embodiment of the present invention. Although the process 600 is described with reference to the flow diagram illustrated in FIG. 6, it will be appreciated that many other methods of performing the acts associated with the process 600 may be used. For example, the order of many of the blocks may be changed, certain blocks may be combined with other blocks, and many of the blocks described are optional.

In the example process 600, data may flow between the automobile market information processing system 302 and a consumer interface 304, a manufacturer interface 308, and a dealer interface 306, as discussed above based on consumer, manufacturer, and dealer interaction with the automobile market information processing system 302. It should be appreciated that the automobile market information processing system 302 may update the automobile market information stored in the database system 310 when automobile market information is received from a consumer, a dealer, or a manufacturer, or from any other information source. Accordingly, the automobile market information may remain current and/or provide sufficiently recent data for the benefit of consumers, dealers, and/or manufacturers.

The example process 600 may begin with a consumer taking a picture of a VIN using a mobile phone application (block 602). The consumer interface 304 may use OCR to determine and provide the VIN to the automobile market information processing system 302 to provide a consumer request (block 604). It should be appreciated that OCR may occur in the automobile market information processing system 302 or at the consumer interface 304. The automobile market information processing system 302 receives the consumer request and prepares automobile market information based on the request (block 606). The automobile market information processing system 302 may send the consumer request and automobile market information based on the consumer request to the manufacturer interface 308 (block 608). It should be appreciated that while the consumer request is automobile market information, typically, additional automobile market information would be provided with the consumer request. For example, typically, data relating to recent sales of the requested automobile and/or comparable automobiles may be provided. In an example embodiment, a target price or "true" value of the requested automobile may be provided. The manufacturer receives the request, determines that an automobile can be provided and prepares and provides verification information for consumer and dealers (block 610). A manufacturer response with the verification information may be provided from the manufacturer interface 308 to the automobile market information processing system 302 (block 612). The automobile market information processing system 302 receives and processes the manufacturer response with the verification and prepares and provides information for consumer and dealers (block 614). The manufacturer response with a verification may be sent from the automobile market information processing system 302 to the consumer interface 304 (block 616). It should be appreciated that other automobile market information may be provided to the consumer interface 304 with a verification, for example, suggested pricing, ratings information, etc. The consumer interface 304 receives the verification that the automobile can be provided, for example, as a confirmation message on the mobile device (block 618).

The automobile market information processing system 302 may also send to the dealer interface 306 a bid request for one or more dealers (block 620). One or more dealers receive a bid request, determine prices and delivery options for the automobile, and prepare and provide bids for the consumer (block 622). A dealer bid may be sent from the dealer interface 306 to the automobile market information processing system 302 for each dealer that wants to provide a bid (block 624). The automobile market information processing system 302 receives and processes dealer bids and prepares the bids and automobile market data for the consumer (block 626). The automobile market information processing system 302 may send dealer bids and automobile market information to the consumer interface 304 (block 628). It should be appreciated that automobile market information may be provided to the consumer before dealer bids are provided, and/or concurrently with dealer bids. Also, it should be appreciated that blocks 616 and 628 may be combined, particularly if the dealer bidding process can occur quickly, for example, in real-time. The consumer may receive dealer bids based on the verification and select a bid including a delivery option based on automobile market information (block 630). The consumer interface 304 may send to the automobile market information processing system 302 a selection of a bid indicating that the consumer wants to purchase or lease the automobile based on the selected bid (block 632). The automobile market information processing system 302 receives and processes the consumer bid selection (block 634). For example, the automobile market information processing system 302 may send the bid selection to the dealer interface 306 (block 636). The dealer may receive the bid selection and coordinate a sale by, for example, instructing the manufacturer to produce and ship the automobile to the dealer location for delivery to the consumer (block 638). Also, for example, the dealer may provide contract or loan documents, collect a deposit or down payment, or the like. As discussed above, in each of blocks 606, 614, 626, and 634, the automobile market information processing system 302 may update the automobile market information in the database system 310 based on the information received from the consumer, dealer, and/or manufacturer.

For exemplary purposes, the present disclosure discusses a various examples relating to a purchase of a car. However, it should be appreciated that the disclosed system, methods, and apparatus may be advantageously used in relation to various automobiles other than cars including, for example, trucks, vans, sport utility vehicles, jeeps, motorcycles, commercial vehicles, and/or automobiles that have a VIN and require a license plate to operate.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

Further, it will be appreciated that the presently disclosed system, methods, and apparatus for performing automobile transactions may be utilized in conjunction with other systems or methods. For example, the presently disclosed system, methods, and apparatus may be used in conjunction with the disclosure in the co-pending commonly-owned patent application filed on Jul. 5, 2011, entitled "AUTOMOBILE TRANSACTION FACILITATION BASED ON CUSTOMER SELECTION OF A SPECIFIC AUTOMOBILE," the entire contents of which are hereby incorporated by reference herein, and in an example embodiment, the features of which may be combined with the features of the present disclosure.

It should be understood that various changes and modifications to the example embodiments described herein will be apparent to those skilled in the art. Such changes and modifications can be made without departing from the spirit and scope of the present subject matter and without diminishing The invention is claimed as follows:

1. A method comprising:

storing, on a computer readable medium, automobile market data which is representative of recent automobile market characteristics, including at least pricing data and inventory data, wherein the automobile market data includes information received from at least one manufacturer, a plurality of dealers, and a plurality of consumers, wherein at least a portion of the automobile market data is updated in real-time;

receiving, via a consumer interface, a first request for a response regarding a first automobile, which is manufactured by a first manufacturer, the first request made by a consumer located at a first location and including geolocation information of the consumer;

executing instructions, by at least one processing device, to:

determine current inventory data of the first automobile, wherein the current inventory data of the first automobile includes a plurality of dealer inventories of a plurality of dealers, with each respective dealer of the plurality of dealers having a respective dealer inventory, and wherein the current inventory data indicates that a first dealer of the plurality of dealers does not currently have the first automobile in a first inventory of the first dealer;

provide first automobile market data including the current inventory data of the first automobile to the first manufacturer, based on the first request, via a manufacturer interface, wherein the first automobile market data is based on real-time automobile market data;

generate, based on the first automobile market data including the current inventory data of the first automobile, via the manufacturer interface, at least one of a verification indicating that the first automobile can be provided for the consumer, a confirmation indicating that the first automobile can be provided for the consumer, and an offer indicating that the first automobile can be provided for the consumer;

determine, using the geolocation information, that the consumer is located at the first location;

generate, based on the first location, an in-market dealer area proximately located to the first location;

determine that the first dealer is located at a second location within the in-market dealer area;

provide a first manufacturer response via the consumer interface, the first manufacturer response including the at least one of the verification indicating that the first automobile can be provided for the consumer, the confirmation indicating that the first automobile can be provided for the consumer, and the offer indicating that the first automobile can be provided for the consumer;

request, from the first dealer, via a dealer interface, an inventoryless bid to sell the first automobile based on the first manufacturer response;

receive, from the first dealer located at the second location and engaging in inventoryless bidding, the inventoryless bid to provide the first automobile, which is at least one of yet to be manufactured and in the inventory of another entity;

generate driving directions from the first location to the second location; and provide the inventoryless bid and the driving directions to the consumer interface, the inventoryless bid including at least a price and a delivery option; and receiving a consumer selection of the inventoryless bid including a first delivery option which specifies a pickup location at the first dealer, wherein the consumer selection indicates a consumer intention to purchase the first automobile.

2. A method comprising:

storing, on a computer readable medium, automobile market data which is representative of recent automobile market characteristics, including at least pricing data and inventory data, wherein the automobile market data includes information received from at least one manufacturer, a plurality of dealers, and a plurality of consumers;

receiving, via a consumer interface, a first request for a response regarding a first automobile, which is manufactured by a first manufacturer, the first request made by a consumer located at a first location and including geolocation information of the consumer;

executing instructions, by at least one processing device, to:

determine current inventory data of the first automobile, wherein the current inventory data of the first automobile includes a plurality of dealer inventories of a plurality of dealers, with each respective dealer of the plurality of dealers having a respective dealer inventory, and wherein the current inventory data indicates that a first dealer of the plurality of dealers does not currently have the first automobile in a first inventory of the first dealer;

provide first automobile market data including the current inventory data of the first automobile to the first manufacturer, based on the first request, via a manufacturer interface;

generate, based on the first automobile market data including the current inventory data of the first automobile, via the manufacturer interface, at least one of a verification indicating that the first automobile can be provided for the consumer, a confirmation indicating that the first automobile can be provided for the consumer, and an offer indicating that the first automobile can be provided for the consumer;

determine, using the geolocation information, that the consumer is located at the first location;

generate, based on the first location, an in-market dealer area proximately located to the first location;

determine that the first dealer is located at a second location within the in-market dealer area;

provide a first manufacturer response via the consumer interface, the first manufacturer response including the at least one of the verification indicating that the first automobile can be provided for the consumer, the confirmation indicating that the first automobile can be provided for the consumer, and the offer indicating that the first automobile can be provided for the consumer;

request, from the first dealer, via a dealer interface, an inventoryless bid to sell the first automobile based on the first manufacturer response;

receive, from the first dealer located at the second location and engaging in inventoryless bidding, the inventoryless bid to provide the first automobile, which is at least one of yet to be manufactured and in the inventory of another entity;

generate driving directions from the first location to the second location; and provide the inventoryless bid and the driving directions to the consumer interface, the inventoryless bid including at least a price and a delivery option; and receiving a consumer selection of the inventoryless bid including a first delivery option which specifies a pickup location at the first dealer.

3. The method of claim 2, wherein the pricing data includes normal listing prices, sale prices, manufacturer incentives, actual prices of executed transactions, and consumer offers.

4. The method of claim 2, wherein the inventory data includes at least one of inventory data by location, inventory in transit data, production lead time data, production schedule data, and shipping schedule data.

5. The method of claim 2, wherein the first request is made by a consumer on a website using a request form including at least one of a text box and a drop down list.

6. The method of claim 2, wherein the first request is made by a consumer using a mobile device which takes a picture of a vehicle identification number.

7. The method of claim 6, wherein the vehicle identification number is recognized using optical character recognition.

8. The method of claim 2, wherein the first automobile is one of a particular type of car with a specific set of features and a particular car with a specific vehicle identification number.

9. The method of claim 2, wherein the first automobile market data provided to the first manufacturer consists of at least one of the first request and a suggested bid price.

10. The method of claim 2, wherein the first automobile market data is based on real-time automobile market data.

11. The method of claim 2, wherein the consumer selection of the inventoryless bid indicates that the consumer intends to one of purchase the first automobile and lease the first automobile.

12. The method of claim 2, further comprising:
causing the at least one processing device to process the consumer selection of the first inventoryless bid to facilitate:
instructing the first manufacturer to provide the first automobile to the first dealer based on the consumer selection of the inventoryless bid; and
executing a sale, including at least one of providing for electronic signature of documents and providing for an electronic funds transfer.

13. The method of claim 12, wherein the first automobile is made available for pickup at the first dealer according to the consumer selected first delivery option.

14. The method of claim 2, wherein the manufacturer interface allows a manufacturer to request data via the consumer interface from a plurality of consumers.

15. The method of claim 2, wherein the manufacturer interface allows a manufacturer to request data via the dealer interface from a plurality of dealers.

16. The method of claim 2, wherein the first dealer at least one of provides and offers at least one of a financing plan, a service plan, an insurance plan, a warranty, and a hard add accessory, for at least the first automobile.

17. The method of claim 2, wherein the first dealer is at least one of a franchise dealer and a non-franchise distribution location.

18. The method of claim 2, wherein the automobile market data includes consumer interest data.

19. The method of claim 2, wherein the first manufacturer response includes an acknowledgment of interest.

20. The method of claim 2, wherein the inventoryless bid includes a first price corresponding to the first delivery option and a second price corresponding to a second delivery option.

21. A system comprising:
a computer readable medium storing automobile market data which is representative of recent automobile market characteristics, including at least pricing data and inventory data, wherein the automobile market data includes information received from at least one manufacturer, a plurality of dealers, and a plurality of consumers; and
at least one processing device operably coupled to the computer readable medium, the at least one processing device executing instructions to:
receive, via a consumer interface, a first request for a response regarding a first automobile, which is manufactured by a first manufacturer, the first request made by a consumer located at a first location and including geolocation information of the consumer;
determine current inventory data of the first automobile, wherein the current inventory data of the first automobile includes a plurality of dealer inventories of a plurality of dealers, with each respective dealer of the plurality of dealers having a respective dealer inventory, and wherein the current inventory data indicates that a first dealer of the plurality of dealers does not currently have the first automobile in a first inventory of the first dealer;
provide first automobile market data including the current inventory data of the first automobile to the first manufacturer, based on the first request, via a manufacturer interface;
generate, based on the first automobile market data including the current inventory data of the first automobile, via the manufacturer interface, at least one of a verification indicating that the first automobile can be provided for the consumer, a confirmation indicating that the first automobile can be provided for the consumer, and an offer indicating that the first automobile can be provided for the consumer;
determine, using the geolocation information, that the consumer is located at the first location;
generate, based on the first location, an in-market dealer area proximately located to the first location;
determine that the first dealer is located at a second location within the in-market dealer area;
provide a first manufacturer response via the consumer interface, the first manufacturer response including the at least one of the verification indicating that the first automobile can be provided for the consumer, the confirmation indicating that the first automobile can be provided for the consumer, and the offer indicating that the first automobile can be provided for the consumer;
request, from the first dealer, via a dealer interface, an inventoryless bid to sell the first automobile based on the first manufacturer response;
receive, from the first dealer located at the second location and engaging in inventoryless bidding, the inventoryless bid to provide the first automobile, which is at least one of yet to be manufactured and in the inventory of another entity;
generate driving directions from the first location to the second location;
provide the inventoryless bid and the driving directions via the consumer interface, the inventoryless bid including at least a price and a delivery option; and receive a consumer selection of the inventoryless bid including a first delivery option which specifies a pickup location at the first dealer.

22. The system of claim 21, wherein the pricing data includes normal listing prices, sale prices, manufacturer incentives, actual prices of executed transactions, and consumer offers.

23. The system of claim 21, wherein the inventory data includes at least one of inventory data by location, inventory in transit data, production lead time data, production schedule data, and shipping schedule data.

24. The system of claim 21, wherein the request is made by a consumer on a website using a request form including at least one of a text box and a drop down list.

25. The system of claim 21, wherein the request is made by a consumer using a mobile device which takes a picture of a vehicle identification number.

26. The system of claim 25, wherein the vehicle identification number is recognized using optical character recognition.

27. The system of claim 21, wherein the first automobile is one of a particular type of car with a specific set of features and a particular car with a specific vehicle identification number.

28. The system of claim 21, wherein the first automobile market data provided to the first manufacturer consists of at least one of the first request and a suggested bid price.

29. The system of claim 21, wherein the first automobile market data is based on real-time automobile market data.

30. The system of claim 21, wherein the consumer selection of the inventoryless bid indicates that the consumer intends to one of purchase the first automobile and lease the first automobile.

31. The system of claim 21, wherein the at least one processing device executes instructions to process the consumer selection of the first bid to facilitate:
 instructing the first manufacturer to provide the first automobile to the first dealer based on the consumer selection of the inventoryless bid; and
 executing a sale, including at least one of providing for electronic signature of documents and providing for an electronic funds transfer.

32. The system of claim 31, wherein the first automobile is made available for pickup at the first dealer according to the consumer selected first delivery option.

33. The system of claim 21, wherein the manufacturer interface allows a manufacturer to request data via the consumer interface from a plurality of consumers.

34. The system of claim 21, wherein the manufacturer interface allows a manufacturer to request data via the dealer interface from a plurality of dealers.

35. The system of claim 21, wherein the first dealer at least one of provides and offers at least one of a financing plan, a service plan, an insurance plan, a warranty, and a hard add accessory, for at least the first automobile.

36. The system of claim 21, wherein the first dealer is at least one of a franchise dealer and a non-franchise distribution location.

37. The system of claim 21, wherein the automobile market data includes consumer interest data.

38. The system of claim 21, wherein the first manufacturer response includes an acknowledgement of interest.

39. A non-transitory computer readable medium storing software instructions which, when executed, cause an information processing apparatus to:
 store automobile market data which is representative of recent automobile market characteristics, including at least pricing data and inventory data, wherein the automobile market data includes information received from at least one manufacturer, a plurality of dealers, and a plurality of consumers;
 receive, via a consumer interface, a first request for a response regarding a first automobile, which is manufactured by a first manufacturer, the first request made by a consumer located at a first location and including geolocation information of the consumer;
 determine current inventory data of the first automobile, wherein the current inventory data of the first automobile includes a plurality of dealer inventories of a plurality of dealers, with each respective dealer of the plurality of dealers having a respective dealer inventory, and wherein the current inventory data indicates that a first dealer of the plurality of dealers does not currently have the first automobile in a first inventory of the first dealer;
 provide first automobile market data including the current inventory data of the first automobile to the first manufacturer, based on the first request, via a manufacturer interface;
 generate, based on the first automobile market data including the current inventory data of the first automobile, via the manufacturer interface, at least one of a verification indicating that the first automobile can be provided for the consumer, a confirmation indicating that the first automobile can be provided for the consumer, and an offer indicating that the first automobile can be provided for the consumer;
 determine, using the geolocation information, that the consumer is located at the first location;
 generate, based on the first location, an in-market dealer area proximately located to the first location;
 determine that the first dealer is located at a second location within the in-market dealer area;
 provide a first manufacturer response via the consumer interface, the first manufacturer response including the at least one of the verification indicating that the first automobile can be provided for the consumer, the confirmation indicating that the first automobile can be provided for the consumer, and the offer indicating that the first automobile can be provided for the consumer;
 request, from the first dealer, via a dealer interface, an inventoryless bid to sell the first automobile based on the first manufacturer response;
 receive, from the first dealer located at the second location and engaging in inventoryless bidding, the inventoryless bid to provide the first automobile, which is at least one of yet to be manufactured and in the inventory of another entity;
 generate driving directions from the first location to the second location;
 provide the inventoryless bid and the driving directions via the consumer interface, the inventoryless bid including at least a price and a delivery option; and
 receive a consumer selection of the inventoryless bid including a first delivery option which specifies a pickup location at the first dealer.

* * * * *